United States Patent
Mein (10) Patent No.: US 7,954,453 B2
(45) Date of Patent: Jun. 7, 2011

(54) SENSOR APPARATUS FOR EXTRACTION MACHINERY FOR MILKING MAMMALS

(75) Inventor: Graeme Mein, Werribee (AU)

(73) Assignee: Lely Patent N.V. (NL)

( * ) Notice: Subject to any disclaimer, the term of this patent is extended or adjusted under 35 U.S.C. 154(b) by 161 days.

(21) Appl. No.: 10/553,332

(22) PCT Filed: Apr. 13, 2004

(86) PCT No.: PCT/NZ2004/000071
§ 371 (c)(1),
(2), (4) Date: Aug. 1, 2006

(87) PCT Pub. No.: WO2004/089069
PCT Pub. Date: Oct. 21, 2004

(65) Prior Publication Data
US 2006/0272580 A1    Dec. 7, 2006

(30) Foreign Application Priority Data
Apr. 14, 2003 (NZ) .................................. 525350

(51) Int. Cl.
*A01J 5/007* (2006.01)
*A01J 5/013* (2006.01)
(52) U.S. Cl. ........................... 119/14.08; 119/14.14
(58) Field of Classification Search ............... 119/14.55, 119/14.46, 14.14, 14.08
See application file for complete search history.

(56) References Cited

U.S. PATENT DOCUMENTS

| | | | |
|---|---|---|---|
| 4,011,838 A | 3/1977 | Nordegren et al. | |
| 4,344,385 A * | 8/1982 | Swanson et al. | 119/14.08 |
| 4,538,634 A * | 9/1985 | Seaborne | 137/103 |
| 4,572,104 A | 2/1986 | Rubino | |
| 4,574,736 A * | 3/1986 | Tanaka et al. | 119/14.08 |
| 5,746,153 A | 5/1998 | Hoefelmayr | |
| 5,992,347 A * | 11/1999 | Innings et al. | 119/14.07 |
| 6,170,434 B1 | 1/2001 | van der Lely | |
| 6,378,455 B1 | 4/2002 | Postma et al. | |
| 6,823,817 B2 * | 11/2004 | van den Berg et al. | 119/14.02 |
| 7,162,970 B2 * | 1/2007 | Maier, Jr. | 119/14.18 |
| 7,174,848 B2 * | 2/2007 | Brown et al. | 119/14.08 |
| 2006/0124064 A1 | 6/2006 | Fullam et al. | |

FOREIGN PATENT DOCUMENTS

EP            1131996         1/1997

(Continued)

OTHER PUBLICATIONS

PCT International Search Report in PCT/NZ2004/000071.
PCT International Preliminary Report on Patentability in PCT/NZ2004/000071.
Hamann, J., and A. Zecconi, 1998, Evaluation of the electrical conductivity of mild as a Mastitis Indicator. Bulletin of the IDF 334, Int. Dairy Fed., Brussels, Belgium.

(Continued)

*Primary Examiner* — Rob Swiatek
*Assistant Examiner* — Kristen C Hayes
(74) *Attorney, Agent, or Firm* — Sheridan Ross P.C.

(57) ABSTRACT

A sensor apparatus to be used with extraction machinery (2), said extraction machinery (2) including a plurality of extraction elements which when activated are adapted to deliver an extracted fluid from two or more extraction elements into a common collection line (3). The sensor apparatus including at least one sensor (4a/4b) positioned in the common collection line (3), and at least one controller (6) adapted to control the activation of said extraction elements, whereby activation of said extraction elements is controlled to prevent said at least one sensor (4a/4b) being exposed to extracted fluid supplied from all of said extraction elements at any one time.

22 Claims, 4 Drawing Sheets

FOREIGN PATENT DOCUMENTS

| | | |
|---|---|---|
| EP | 1123651 | 8/2001 |
| EP | 1369031 | 12/2003 |
| GB | 2055543 | 3/1981 |
| NL | 1020805 | * 12/2003 |
| NZ | 238275 | 5/1991 |
| WO | WO 97/01953 | 1/1997 |

OTHER PUBLICATIONS

Supplementary European Search Report for International Application No. EP 04727162, dated Oct. 24, 2008.

Examination Report dated Apr. 16, 2004, for New Zealand Patent Application No. 525350.

* cited by examiner

SENSOR APPARATUS FOR EXTRACTION MACHINERY FOR MILKING MAMMALS

TECHNICAL FIELD

This invention relates to a sensor apparatus to be used with extraction machinery. Preferably the present invention may be adapted to sense or detect the presence of specific components within a fluid extracted by such extraction machinery, where the apparatus is exposed to different streams of extracted fluid to indicate differences in said streams. Reference throughout this specification will also be made to the present invention providing sensor apparatus for milking machinery, where the sensor in question can detect differences between milk supplied from each of a dairy animal's half or quarter udder sections. However, those skilled in the art should appreciate that other applications are also envisioned for the invention and reference to the above only throughout this specification should in no way be seen as limiting.

BACKGROUND ART

Dairy farmers collect milk from herd animals using extraction machinery in the form of milking machines. A dairy farmer will periodically process his or her herd with such machinery to extract milk to be used in food or dairy products.

In the case of dairy cows a set of four teatcups are employed to extract milk simultaneously from the four quarters of the cow's udder. These four teatcups are generally connected together at a single point to a common supply tube or line for milk extracted, with the resulting collection of four cups commonly being referred to as a milking unit. Vacuum or low pressure is applied to these four teatcups simultaneously to deliver the milk extracted into a single collection line, commonly known as the 'long milk tube'.

The four distinct udder quarters and associated teats express milk with various qualities due to microbiological infections which can occur independently in each udder quarter. Furthermore, medications delivered to the animal to combat such infections can form a contaminant in the milk expressed by each quarter.

As part of quality control regime, existing sensing and analytical equipment can be used to test the milk obtained for such contaminants or the presence of microbiological infections. However, an infection or other contaminants present in one udder quarter only will produce milk which is subsequently diluted by milk obtained from the other, potentially healthy quarters of the udder. This, can for example, make it difficult to detect the start of an infection in one quarter only of the cow's udder.

It is also known to test the foremilk or the composite volume of milk extracted from individual quarters of a dairy animal to obtain an accurate and sensitive sample used to indicate the presence of such contaminants or infections. However, using traditional milking machinery and equipment, there is no facility provided for the extraction, sampling or testing of foremilk instead of the main volume of milk to be extracted.

One potential mechanism which could be employed to sample or test the milk produced per quarter, would be to place the particular type of sensor or transducer required within the teatcup used for each quarter of the udder. A single sensor can be provided for each teatcup to in turn sample the milk extracted from a single quarter.

However this approach is not necessarily practical as the sensor required would be placed in a relatively hazardous environment. The sensor used would be exposed to moisture and dirt on a frequent basis and would also be in danger of mechanical damage through being kicked or trodden on by the rear hooves of a cow.

Furthermore, the provision of multiple sensors would be a relatively expensive mechanism due to the costs of the multiple components used. The provision of multiple sensors or transducers will also require multiple calibration procedures or runs to be implemented frequently to ensure accurate results may be obtained from each sensor. Data or control signal transmission lines to such sensors would also need to be run through this hazardous environment and again, would be subject to maintenance and damage problems.

An improved sensor apparatus for extraction machinery (and preferably milking machinery) which addressed any or all of the above problems would be of advantage. An apparatus which minimised the number of independent transducers required and which could independently test the milk extracted from each test and udder section of a dairy animal would be of advantage. Furthermore, a sensor apparatus which maintained or positioned sensor transducers in a relatively secure, clean, dry and/or easily accessible environment would be of advantage.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a controller adapted for use with extraction machinery, said extraction machinery including a plurality of extraction elements which when activated are adapted to deliver an extracted fluid from two or more extraction elements into at least one collection line, wherein the controller is adapted to control the activation of said extraction elements to prevent fluid supplied from all extraction elements entering said at least one collection line at any one time.

According to a further aspect of the present invention there is provided a sensor apparatus adapted to be used with extraction machinery, said extraction machinery including a plurality of extraction elements which, when activated, are adapted to deliver an extracted fluid from two or more extraction elements into at least one collection line, the sensor apparatus including at least one sensor associated with said at least one collection line, and at least one controller adapted to control the activation of said extraction elements, whereby activation of said extraction elements is controlled to prevent said at least one sensor being exposed to extracted fluid supplied from all of said extraction elements at any one time.

The present invention is adapted to provide a sensor apparatus, which preferably is to be used with, within or be associated with extraction machinery. Such extraction machinery can be employed to extract a particular fluid from any number of different environments.

Furthermore, the present invention also incorporates or encompasses the provision of a controller adapted to control the activation of the extraction elements discussed above. Those skilled in the art should appreciate that such a controller may be provided or implemented irrespective of the sensor apparatus discussed throughout this specification. For example, in one alternative embodiment, the controller employed may be used to apply a pre-stimulation effect to animals from which fluid is to be extracted by the plurality of extraction elements provided. However, reference primarily will be made throughout the specification to the implementation of the present invention as a sensor apparatus but those skilled in the art should appreciate that other applications are also envisioned.

In a preferred embodiment the extraction machinery with which the present invention is to be used may be milking machinery used by dairy farmers. This dairy animal milking machinery may extract milk from any number of a range of dairy animals such as cows, sheep, goats or any lactating mammal which can be milked cost effectively or efficiently. Milk, being the extracted fluid involved, can be removed from a dairy animal using such milking machinery with the sensor apparatus of the present invention being employed to test, analyse or detect the presence of particular compounds or components within the milk extracted.

Reference throughout this specification will also be made to the present invention being adapted to provide a sensor apparatus to be used with milking machines employed to milk dairy cows. However, those skilled in the art should appreciate that other applications are also envisioned for the present invention and reference to the above only throughout this specification should in no way be seen as limiting.

Preferably the milking machinery employed includes or incorporates a plurality of extraction elements for each individual cow to be milked. Each of the extraction elements may engage with a test and associated portion of a cow's udder to extract milk from same.

In a further preferred embodiment, an extraction element may be formed from a teatcup and a pulsator valve associated with a pulsation system. A single cup and pulsator valve combination can be used to extract milk from a specific quarter of a cow's udder through the application of a pressure or vacuum lower than atmospheric pressure.

Furthermore, reference throughout this specification will also be made to a teatcup being employed to extract milk from a single udder quarter. However, those skilled in the art should also appreciate that a single teatcup may extract milk from an udder half section in relation to some types of dairy animal and reference to the term 'quarter' or 'udder quarters' throughout this specification should in no way be seen as limiting. Preferably the present invention may be employed to allow for the controlled application of vacuum or low pressure to individual udder sections of a dairy animal.

Reference throughout this specification will also be made to the milking machinery involved having four extraction elements or teatcups and four associated pulsator lines per cow to be milked at any one time. In this way, the present invention may be adapted for use with a standard milking unit used to service a single cow at one time. Again, however those skilled in the art should appreciate that different configurations of milking machinery may also be employed and reference to the above only throughout this specification should in no way be seen as limiting.

Such pulsator lines and teatcups can be activated in a controlled manner to apply vacuum or pressure below atmosphere pressure to teats of an udder. Furthermore the activation of these extraction elements may preferably be monitored and controlled to ensure efficient and safe milking of a cow, in addition to facilitating the implementation of the present invention.

Preferably the teatcups provided in such milking machinery may be adapted to deliver the extracted fluid or milk involved into at least one collection line. The combined milk from two or more cups and associated udder halves or quarters of a single animal may be collected through the same collection line. Such a collection line will preferably run to a storage vat which collects and stores milk extracted from an entire dairy herd during one or more milkings.

In a further preferred embodiment, a single collection line may service or collect milk from all four teatcups associated with a single milking unit. This single collection line, which may be defined as a long milk tube, can provide a common linkage from a unified milk collection system to the cups employed with a single milking unit. This long milk tube or single collection line travels at one end from a relatively harsh environment immediately adjacent to the cow's udder, through to cleaner, drier and more accessible regions at which other elements of the milking machinery involved are located.

Reference throughout this specification will be to a single collection line or long milk tube to be adapted to collect milk from all four cups used to milk a single cow. However those skilled in the art should appreciate that a plurality of collection lines with each being adapted to receive milk from two or more extraction elements can also be used in conjunction with the present invention, and reference to the above only throughout this specification should in no way be seen as limiting.

Preferably the sensor apparatus provided in conjunction with the present invention may include at least one sensor which is associated with or located in, or in proximity to at least one collection line. For example, in a preferred embodiment a single sensor may be integrated into or located in a single collection line or long milk tube which services four teatcups and a single milking unit. The sensor or sensors employed can preferably be exposed to milk travelling down the single milk collection line to sample, test or analyse same.

Reference throughout this specification will also be made to the present invention providing a single sensor only within the milk collection line or in a position which allows exposure of such a sensor to milk travelling through a single collection line servicing four teatcups. However those skilled in the art should appreciate that other configurations of the present invention are envisioned and reference to the above only throughout this specification should in no way be seen as limiting.

Reference throughout this specification will also be made to a sensor employed being located within a long milk tube or collection line, or potentially forming a serial extension to such a line. This position of a sensor will allow ready access and exposure to milk travelling through such lines.

A sensor as used in conjunction with the present invention may be formed from any of a number of different types of components or apparatus. The sensor or sensors employed may be adapted to detect the presence of contaminants in milk for example, or to measure milk flow rates, volumes, fat, protein or hormone concentrations or any other values or parameters of interest. Those skilled in the art should appreciate that a wide range and number of different types of sensor components and transducers may be used in conjunction with the present invention depending on the particular compound, component or variable to be analysed or detected within the extracted milk.

In a further preferred embodiment, the sensor employed may measure the electrical conductivity of milk travelling through a collection line. Changes in conductivity are known to be associated with tissue damage due to the presence of microbiological pathogens within an udder and which indicate one or more udder quarters of a dairy cow are experiencing some form of mastitis.

Reference throughout this specification will also be made to the present invention being implemented through the use of a single electrical conductivity sensor within a long milk tube servicing four separate teatcups and a single milking unit. However, those skilled in the art should appreciate that other configurations of the present invention are envisioned and reference to the above only throughout this specification should in no way be seen as limiting.

In a preferred embodiment the sensor apparatus provided may include at least one controller. A controller may be adapted to control the activation of specific extraction elements or pulsator and cup combinations supplying a single milk collection line at any one time. A controller may preferably be formed from known electrical components such as microprocessors or equivalent analogue circuitry which can be adapted to manage the application of vacuum or low pressure through the teatcups provided.

In a further preferred embodiment a controller may be provided by a pulsator controller normally employed or incorporated into existing standard dairy animal milking machinery. Such a pulsator controller may be programmed or modified in conjunction with the present invention to vary the times at which specific extraction elements are activated.

In a preferred embodiment the present invention may employ a quad-tube pulsator unit per milking unit employed in the milking machinery involved. A quad-tube pulsator unit may be formed from two twin tube pulsator units per milking unit, or by customised arrangement of elements which provides four independent pulse lines or tubes in turn to each of the teatcups of a milking unit. In such embodiments the controller can be used to activate a pulsator valve of each extraction element, where each pulsator valve is associated with a single independent pulsator line. The use of a quad-tube pulsator unit ensures that vacuum or low pressure may be applied to each of the teatcups in turn of a milking unit, thereby controlling activation timing of each of these independent extraction elements.

In a preferred embodiment, the controller employed may be programmed, designed or otherwise implemented to control the operation of the quad-tube pulsator unit discussed above. The pulsator controller may emit or issue control signals which operate four separate and independent valves used to apply vacuum or low pressure to each of the teatcups or milking unit in turn.

In a preferred embodiment the controller may be adapted to control the activation of extraction elements so that a sensor within the long milk tube is not exposed to milk supplied from all of the connected extraction elements at any one time. For example, in a preferred embodiment the pulsator controller employed may activate the pulsators of each teatcup in a cyclical, sequential manner. This will prevent specific cups from delivering milk into the long milk tube at the same time as other cups associated with the same udder.

In a further preferred embodiment the controller may be adapted to activate a single extraction element at any one time when a sample of milk to be analysed by the sensor is to be delivered into the long milk tube. This configuration of the controller and its use in conjunction with the present invention ensures that the single sensor within the long milk tube can provide an analysis of milk in transit from a single udder half or quarter only. This allows ailments affecting the particular udder half or quarter in question to be diagnosed in isolation, or for specific contaminants sourced from a single udder half or quarter to be identified without dilution of the milk involved from milk supplied via other udder sections.

Through providing a controlled cyclic activation of suction applied to cups, this can in turn provide an udder stimulation effect prior to a full milking. Milk ejection may be stimulated by the tactile effects of attaching the teatcups and the subsequent physical stimulus provided to the whole udder by pulsating or activating each teatcup in sequence. This pre-stimulation effect may elicit a good milk ejection from the dairy animal involved.

Reference throughout this specification will also be made to the controller employed allowing for the delivery of milk from a single pulsator and milk cup to a sensor for sampling or analysis at any one time. However those skilled in the art should appreciate that other configurations of the present invention are envisioned and reference to the above only throughout this specification should in no way be seen as limiting.

For example, in one alternative embodiment, the milk from two quarters may be extracted and combined within a long milk tube when the sensor employed is activated to sample or analyse said milk. This embodiment would necessarily speed up the sampling and analysis process implemented in conjunction with the present invention, allowing the high flow rate milk extraction required after sampling or analysis to occur earlier.

In a preferred embodiment, the controlled activation of extraction elements may be adapted to expose the sensor involved to the foremilk obtained from each udder quarter at the start of a milking. Foremilk is known to contain comparatively high concentrations of somatic cells or microbiological organisms, and as such can provide a fluid with relatively high sensitivity to the changes to be detected or measured in conjunction with the present invention.

In such embodiments, the cyclic, controlled activation of milking cups and pulsators can be used to draw foremilk from the quarters of a cow's udder for subsequent analysis by the sensor provided. Once the foremilk required has been extracted and tested or analysed, a normal milking operation may be implemented with milk being drawn from all four quarters of a cow's udder and delivered simultaneously into the long milk tube.

In a further preferred embodiment, a drainage delay period between the activation of specific milking cups and pulsators may also be implemented by the controller. A delay period may be used to allow the milk supplied from a particular quarter or quarters to be removed by drainage from a long milk tube prior to the delivery of further milk from other quarters of a cow's udder. Such a delay period can prevent cross-contamination of milk from various or different quarters, and thereby allow the present invention to provide readings specific to particular quarters more accurately.

In a further preferred embodiment, the order or sequence in which particular cups and pulsators are activated may be randomised. Randomly selecting the first extraction element or elements to be activated can prevent the same test and udder quarter being selected repetitively in the same sequence and thereby prevent an off-set or biased results being obtained.

In a preferred embodiment the pulsator valves of non-activated extraction elements may be partially activated during extraction of fluid from an activated extraction element. In this embodiment partial activation of an extraction element may not cause fluid to be extracted and delivered to a collection line.

In such embodiments, the controller employed may fully activate one pulsator and associated cup while in turn synchronously triggering suppressed, minimal or partial activation of the other teatcups of the milking unit. This suppressed or minimal activation may provide a massaging or stimulating effect to the other udder quarters involved without necessarily being enough to allow milk withdrawal from each udder quarter. A suppressed pulsation may be applied in such embodiment to provide a heightened pre-stimulation effect to the cow's udder prior to full, high flow rate milk extraction.

In a preferred embodiment, the sensor apparatus provided may include an indicator mechanism which receives the specific reading or output signal obtained from the sensor or sensors provided. An indicator can, for example, provide a display, alert or alarm signal to an operator of the milking machinery to indicate that the milk obtained from a particular quarter is abnormal—prior to the bulk of this abnormal milk being delivered into a storage vat for the entire dairy herd involved. Such an indicator may take the form of an audio alarm signal or some form of visual display such as a flashing light.

In a further preferred embodiment, an indicator may provide an output signal or display which is representative of a ratio of readings or measurements taken and compared with respect to the four udder quarters of the dairy animal involved. In such instances, fluid or milk abnormalities can be detected through a comparison of ratios of sensor output signals obtained from fluid or milk extracted from an alternative extraction element or elements. Abnormalities or differences in the milk produced by different quarters can be seen easily with such ratio comparisons and therefore will provide a clearer indication that an abnormality has been detected or sensed.

However, in an alternative embodiment different indications or processing of the information or signals obtained from a sensor may be applied. For example, when an animal or herd identification system is linked to the sensor apparatus, a rolling average of measurements made on a specific quarter of the identified animal's udder may be considered. Major or significant changes over time in the measurements obtained with respect to the selected udder relative to the herd average can therefore be detected and indicated or displayed.

In a further preferred embodiment the sensor apparatus may also include a trigger mechanism associated with such an indicator. This trigger mechanism may be used to control the operation or activation of further components employed in conjunction with the present invention. For example, in one preferred embodiment a trigger mechanism may be employed to operate a diversion system to divert or isolate milk determined to be abnormal prior to this milk being delivered to a common collection line or collection vat. If, for example, information or readings obtained from the indicator mechanism show that milk is contaminated or has been supplied from an infected udder quarter, such a trigger mechanism may operate a diversion system to ensure that this milk is isolated from the other 'normal' milk.

The present invention may provide many potential advantages over the prior art.

The present invention may allow for the sampling and investigation of milk from a single or limited numbers of quarters of dairy animal's udder. The sensing apparatus provided can give an indication of problems with specific quarters relatively accurately, preferably due to the sampling of milk in isolation from such quarters.

The present invention may also be adapted to sample or analyse the foremilk produced from an udder quarter, again to improve the accuracy of results or measurements obtained.

In addition the delayed synchronous activation of extraction elements or milking cups and pulsators can provide a "pre-stimulation" effect to assist in more efficient or faster overall milking of the dairy animal involved. The cyclic extraction of relatively small quantities of milk from each quarter may provide such a pre-stimulation effect.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
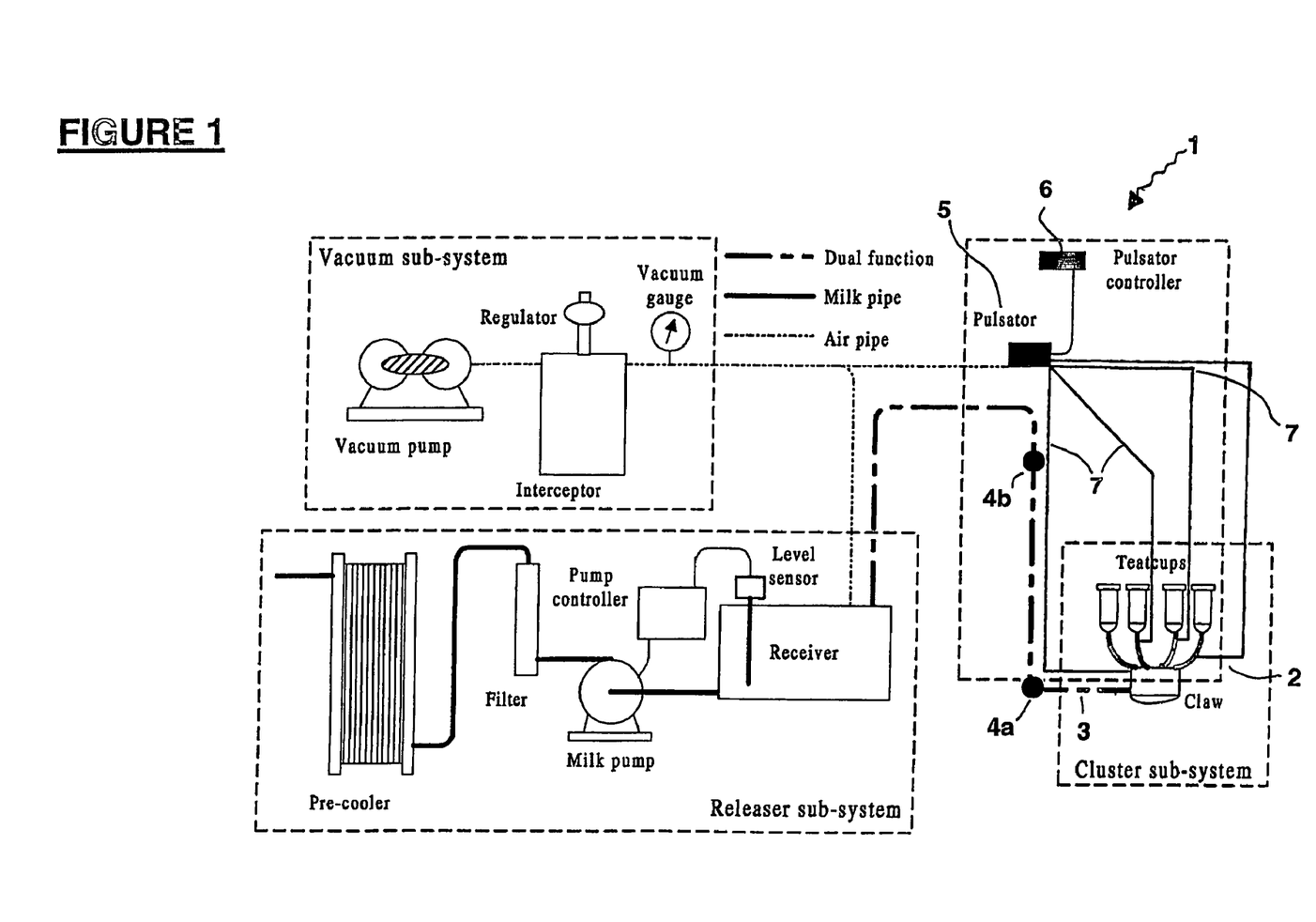
FIG. 1 illustrates a schematic diagram of a sensor apparatus as configured in accordance with one embodiment of the present invention when used in conjunction with a milking machine for dairy cows.

FIG. 1 illustrates a schematic diagram of a sensor apparatus as configured in accordance with a preferred embodiment when used with dairy cow milking machinery.

The milking machinery (1) shown includes a standard vacuum sub-system and a standard releaser sub-system which interface with modified cluster and pulsation sub-systems.

A standard milking unit or claw (2), which provides four distinct and separate teatcups, is engaged with a long milk collection tube (3) which subsequently feeds into the releaser sub-system. Also disposed within the collection line is a single sensor (4a), where through operation of the present invention, this sensor (when activated) is exposed to extracted milk supplied from preferably one teatcup only. Reference 4b illustrates an alternative location for the same single sensor within the long milk line in an alternative embodiment.

The pulsator sub-system includes a quad-tube pulsator (5) which is operated or controlled by a pulsator controller (6).

The quad-tube pulsator provides four separate and independent vacuum lines (7) to each of the four teatcups. This quad-tube pulsator can then in turn apply low pressure or vacuum to each teatcup independently to in turn allow milk extraction from a single teatcup. Milk extracted from a single teatcup can subsequently be analysed in isolation by the sensor provided.

The pulsator controller can also control the operation of the quad-tube pulsators to apply a relatively low maximum vacuum level to each teatcup which is not currently being activated for sampling of milk. Application of a low maximum vacuum level within the teatcup pulsation chamber can provide a pre-stimulation effect to all remaining teatcups, without necessarily allowing milk extraction.

Figures 2, 3:
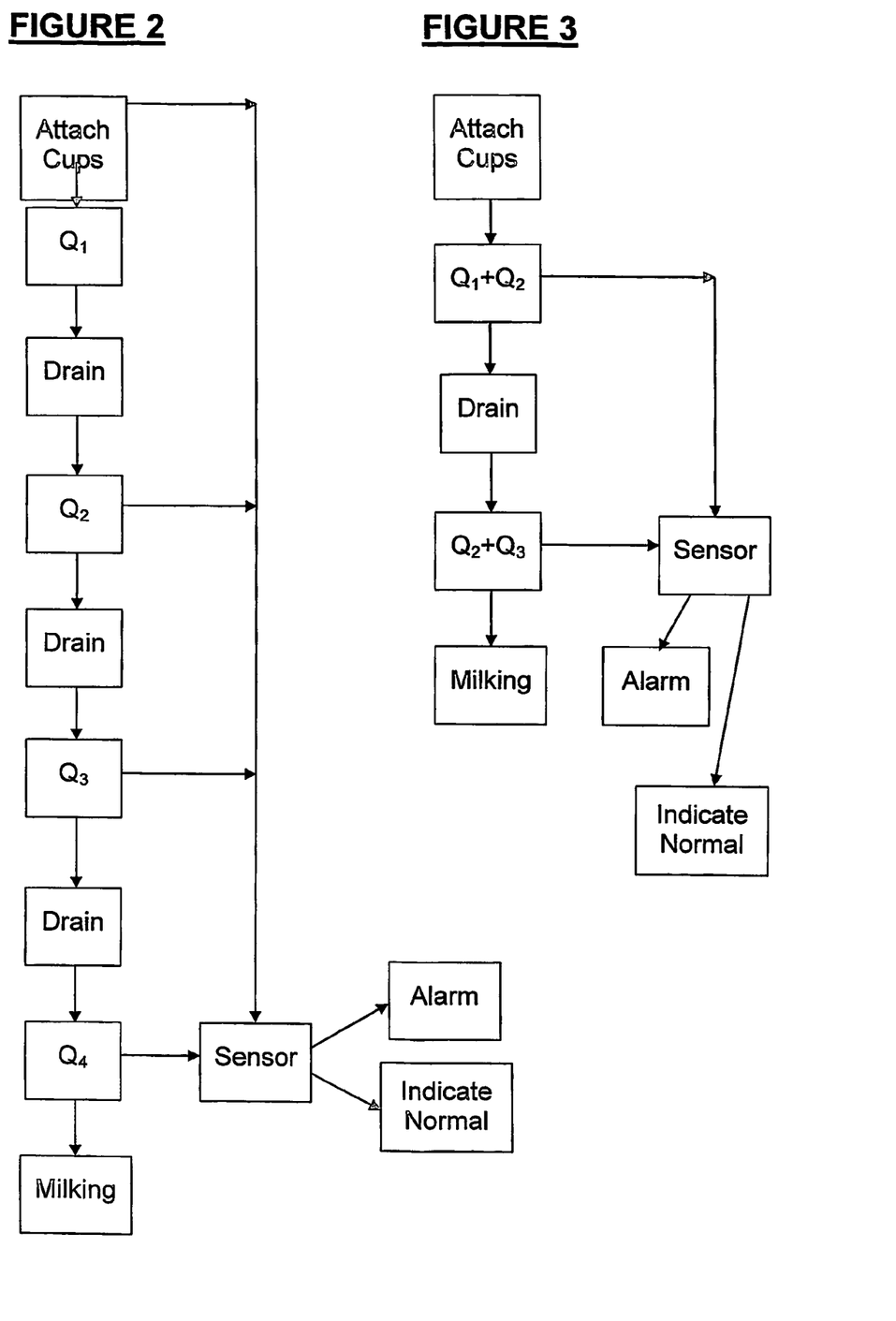
FIG. 2 illustrates a block schematic flowchart diagram of steps executed by the pulsator controller discussed with respect to FIG. 1.
FIG. 3 illustrates a block schematic flowchart diagram of an alternative pulsator controller programming sequence used in an alternative embodiment available for use with the pulsator controller discussed with respect to FIG. 1.

FIG. 2 illustrates a block schematic flowchart diagram of steps executed by the pulsator controller discussed with respect to FIG. 1.

In the embodiment shown, the pulsator controller first waits for the four cups of a single milking unit to be attached to the teats of a cows udder. When the initial test positions within their respective teatcups have stabilised, the controller employed then moves to the next operational step shown. At this stage the controller activates the teatcup and pulsator, indicated as cup Q1 allowing the first udder quarter to continue to be milked.

Sensor readings are obtained from the first quarter only through the controller activating only the pulsator and associated teatcup involved. Once the sensor readings required have been obtained, a delay period where no pulsators are activated may be implemented by the controller to allow the long milk tube in which the sensor is located to be emptied clear of any milk supplied from the first quarter.

These two steps are then subsequently repeated for the second (Q2) third (Q3) and fourth (Q4) quarters of the udder currently awaiting milking.

As discussed above, with each subsequent activation of the independent cups Q1 through Q4 a sensor is operated to detect abnormalities in the milk elicited from each cup.

If at any stage the sensor readings obtained from any quarter exceed a predetermined threshold value indicating the likely presence of a contaminant or an infection, an alarm condition is triggered. This alarm condition can for example provide a visual indicator of a problem to the operator of the milking machinery involved, or alternatively trigger the activation of a diversion mechanism which isolates any milk obtained from the current animal being milked from a common collection system and vat.

Alternatively, if no abnormalities are detected, an indicator confirming the quality of the milk and its normal condition can be activated.

FIG. 3 illustrates a block schematic flowchart diagram of an alternative pulsator controller programming sequence as discussed with respect to FIG. 2.

In the embodiment shown with respect to FIG. 3, a compromise is made between the speed at which samples are obtained from quarters and the accuracy of the measurements made. In the scheme discussed with respect to FIG. 3, the pulsator controller employed activates the pulsators associated with both the first and the second quarters of the udder synchronously. This results in milk withdrawal from both quarters at once which is supplied to the long milk tube and associated sensor stage. Again, an alarm warning signal or indicator can be activated on the detection of abnormal milk, or in the alternative an indicator advising that the milk is normal is activated.

A similar process is then completed after the long milk tube has been allowed to drain to obtain combined milk from both the third and fourth quarters of the udder.

This compromise programming will provide combined or approximate results from a pair of udder quarters at once, but will speed up the entire sample taking and processing times involved.

Figure 4:
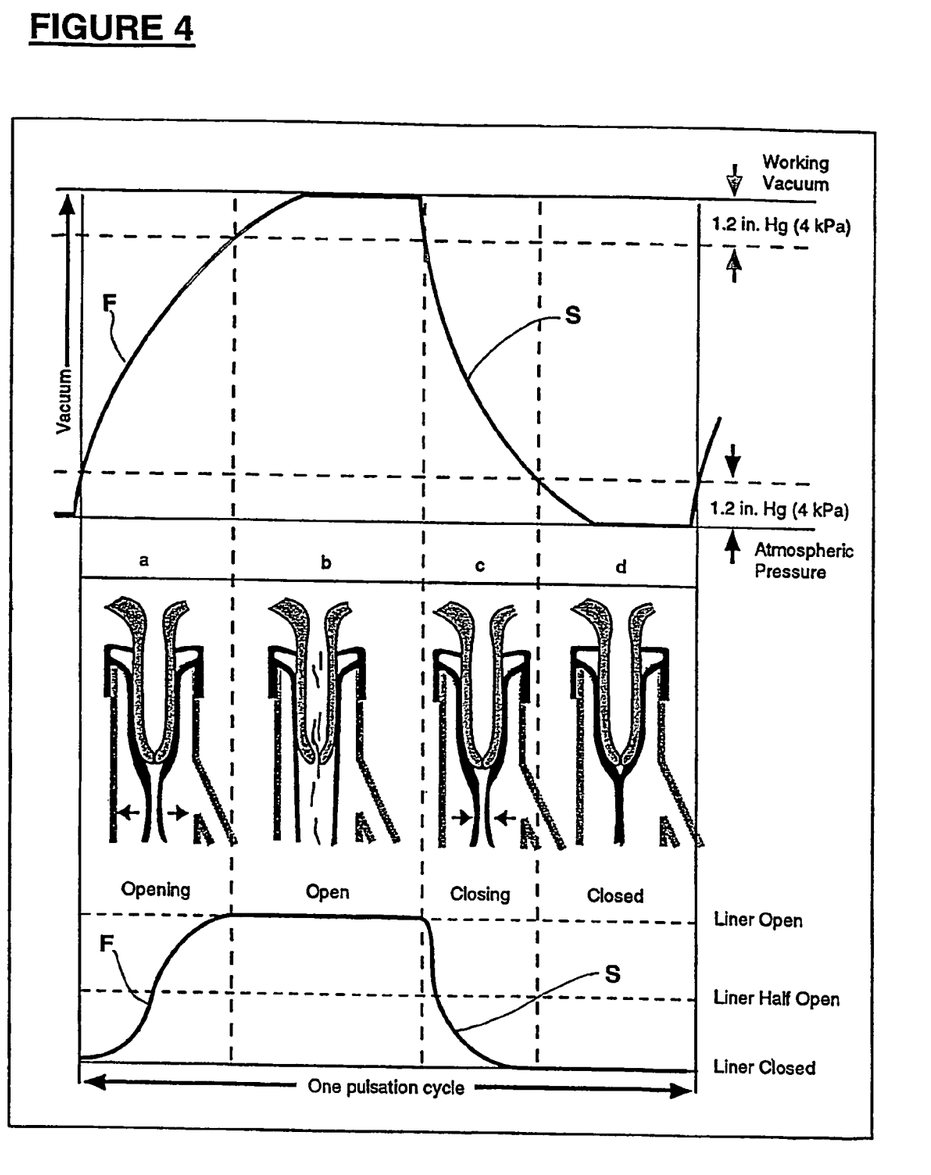
FIG. 4 illustrates a series of pressure versus time and test state positions experienced during a single pulsation of a standard milk line pulsator.

FIG. 4 illustrates a series of pressure versus time and test state positions experienced during a single pulsation of a standard milk line pulsator.

As can be seen from the diagram shown with respect to FIG. 4, the initial position of the test shown is in the opening phase where vacuum is increasing and milk starts to flow from the test in the time region F indicated. Conversely when the vacuum begins to drop substantially in region S, milk flow will be stopped by the closing liner.

As can be seen from FIG. 4, an applied vacuum below the threshold level indicated at F or S will supply a physical stimulation effect to the test but will not necessarily allow milk extraction. Conversely a vacuum applied above this region or level will allow milk to flow until the closing liner applies a sufficient closing force around the test-end.

Figure 5:
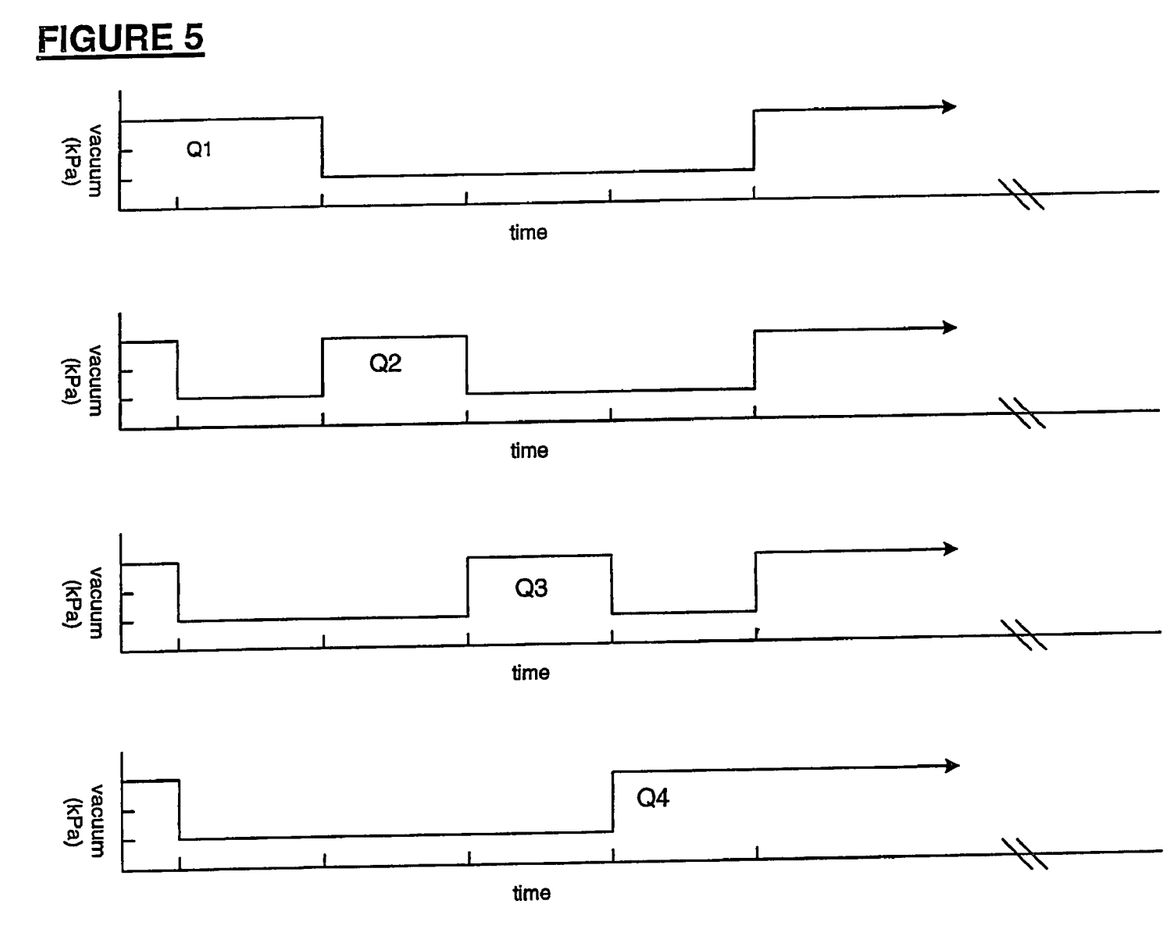
FIG. 5 shows a series of plots of pressure versus time for four individual teatcups of a single milk unit or milking unit adapted for use with the present invention.

FIG. 5 shows a series of plots of pressure versus time for four individual teatcups of a single milk unit or milking unit adapted for use with the present invention.

As can be seen from the plots shown with respect to FIG. 5, the vacuum or low pressure applied to the pulsation chambers of each teatcup Q1 through Q4 varies over time. Initially, a high vacuum is applied to allow the teats to stabilise within their respective teatcups. Next the vacuum applied to the pulsation chambers of teatcups Q2 through Q4 is dropped to below a threshold vacuum level which will not elicit milk flow from each test but which will supply a pre-stimulation effect to same. At the same time a high vacuum is applied to the pulsation chamber of teatcup Q1 to elicit a milk flow for sampling and analysis.

After test Q1 has been sampled the same approach is taken with respect to test Q2, and the same pre-stimulation low vacuum is now applied to test Q1, Q3 and Q4 consecutively without eliciting a milk ejection.

In this manner, all four teats can be pre-stimulated prior to extraction of substantial volumes of milk, while a sample of milk may be extracted from each test independently for sampling analysis prior to a full milking. As can be seen from FIG. 5 once a milk sample is obtained from all four teats, a normal vacuum can then be applied to the pulsation chambers of each of the teatcups to elicit a full simultaneous milking.

Aspects of the present invention have been described by way of example only and it should be appreciated that modifications and additions may be made thereto without departing from the scope thereof as defined in the appended claims.

What I claim is:

1. A milk extraction machinery sensor apparatus, the milk extraction machinery including a plurality of extraction elements, the sensor apparatus including:
    a single collection line connected to the plurality of extraction elements, wherein the plurality of extraction elements extract milk into the single collection line;
    a sensor associated with the single collection line, wherein the sensor detects at least one of an indicator of mastitis, a compound, a component, a contaminant, and a pathogen of the extracted milk; and
    a controller that controls:
        activation and timing of the extraction elements, and
        a delay period,
    wherein the extraction elements are activated in at least one of a cyclical, a sequential, and a random manner, wherein the controller activates a single extraction element or pair of extraction elements and the sensor senses extracted milk from the activated extraction element or elements such that the sensor senses extracted milk from only one extraction element or one pair of extraction elements at any one time, followed by the controller entering delay period to allow the extracted milk to drain from the single collection line, and wherein the activating, sensing, and delay period are repeated for one or more additional extraction elements.

2. The sensor apparatus of claim 1, wherein all of the extracted milk passes through the single collection line.

3. The sensor apparatus of claim 1, wherein the sensor measures electrical conductivity.

4. The sensor apparatus of claim 1, wherein foremilk is extracted by the plurality of extraction elements.

5. The sensor apparatus of claim 1, wherein each of the extraction elements comprise a single teatcup associated with a single pulsator line.

6. The sensor apparatus of claim 5, wherein the controller comprises a pulsator controller.

7. The sensor apparatus of claim 6, wherein the teatcups are activated by activating a pulsator valve associated with the pulsator line to apply a cyclic change in air pressure.

8. The sensor apparatus of claim 7, wherein there is a threshold vacuum level having a negative air pressure required to activate the teatcups, below which milk is extracted and delivered to the single collection line.

9. The sensor apparatus of claim 8, wherein at least one of the teatcups is pulsated by a cyclic change in air pressure above the threshold level.

10. The sensor apparatus of claim 1, wherein only one of the plurality of extraction elements is activated at one time.

11. The sensor apparatus of claim 1, wherein a pair of the plurality of extraction elements are activated at one time.

12. The sensor apparatus of claim 1, wherein the controller sequentially activates the plurality of extraction elements.

13. The sensor apparatus of claim 1, wherein the controller randomly activates the extraction element or elements.

14. The sensor apparatus of claim 1, further comprising an indicator that receives an output signal from the sensor, wherein the indicator signals an alarm to indicate that the sensor has detected abnormal milk.

15. The sensor apparatus of claim 14, further comprising a diversion system associated with the indicator to isolate abnormal milk.

16. The sensor apparatus of claim 14, wherein milk abnormalities are detected through a comparison between a sensor output signal indicating a value of the extracted milk from an udder quarter or half, and a sensor output signal indicating the value of the extracted milk from other quarters or half of the same udder by an alternative extraction element or elements.

17. The sensor apparatus of claim 14, wherein a rolling average of sensor readings is used to detect abnormalities in the milk extracted.

18. A sensor apparatus for milk extraction machinery, the milk extraction machinery including a plurality of extraction elements, the sensor apparatus including:

a single collection line connected to the plurality of extraction elements, wherein the plurality of extraction elements extract milk into the single collection line;

a sensor associated with the single collection line, wherein the sensor detects milk abnormalities by comparing a sensor output signal indicating a value of the milk extracted from an udder quarter or half by an extraction element or elements and a sensor output signal indicating the value of the milk from other quarters or half of the same udder by an alternative extraction element or elements; and a controller that controls
  activation and timing of the extraction elements, and
  a delay period,
wherein the controller activates a single extraction element or pair of extraction elements and the sensor senses extracted milk from the activated extraction element or elements such that the sensor senses extracted milk from only one extraction element or one air of extraction elements at any one time, and wherein the activating, sensing, and delay period are repeated for one or more additional extraction elements.

19. The sensor apparatus of claim 18, wherein the sensor measures electrical conductivity.

20. The sensor apparatus of claim 19, further comprising an indicator that receives an indication of milk abnormality, and wherein the indicator signals an alarm to indicate that the sensor has detected abnormal milk.

21. The sensor apparatus of claim 20, further including a diversion system associated with the indicator to isolate abnormal milk.

22. A sensor apparatus for milk extraction machinery, the milk extraction machinery including a plurality of extraction elements, the sensor apparatus including:

a single collection line connected to the plurality of extraction elements, wherein the plurality of extraction elements extract milk into the single collection line;

a sensor associated with the single collection line, wherein the sensor detects milk abnormalities by comparing a sensor output signal indicating a value of the milk extracted from an udder quarter or half by an extraction element or elements and a sensor output signal indicating the value of the milk from other quarters or half of the same udder by an alternative extraction element or elements; and a controller that controls
  activation and timing of the extraction elements,
wherein the controller activates a single extraction element or pair of extraction elements and the sensor senses extracted milk from the activated extraction element or elements such that the sensor senses extracted milk from only one extraction element or one pair of extraction elements at any one time, and wherein the activating and sensing are repeated for one or more additional extraction elements.

* * * * *